United States Patent [19]

Wright

[11] Patent Number: 4,601,591
[45] Date of Patent: Jul. 22, 1986

[54] ELASTOMERIC BEARING DAMPER APPARATUS AND ASSOCIATED METHODS

[75] Inventor: E. Scott Wright, Mesa, Ariz.

[73] Assignee: The Garrett Corporation, Los Angeles, Calif.

[21] Appl. No.: 609,922

[22] Filed: May 14, 1984

[51] Int. Cl.⁴ ............................................ F16C 27/06
[52] U.S. Cl. ..................................... 384/536; 384/611
[58] Field of Search ............... 384/215, 192, 495, 221, 384/535, 223, 536, 220, 558, 581, 582, 611, 612, 620

[56] References Cited

U.S. PATENT DOCUMENTS

| | | | |
|---|---|---|---|
| 2,063,216 | 12/1936 | Zaparka | 267/30 |
| 2,117,264 | 5/1938 | Workman | 248/358 |
| 2,126,703 | 8/1938 | Schmidt | 287/85 |
| 2,126,704 | 8/1984 | Schmidt | 287/85 |
| 2,162,714 | 6/1939 | Hamblin | 248/358 |
| 2,760,359 | 8/1956 | Wildhaber | 64/8 |
| 2,829,016 | 4/1958 | Hirst | 384/582 |
| 2,858,127 | 10/1958 | Moulton | 267/63 |
| 2,900,182 | 8/1959 | Hinks | 267/57.1 |
| 2,942,872 | 6/1960 | Moller | 267/63 |
| 3,045,998 | 7/1962 | Hirst | 267/3 |
| 3,047,345 | 7/1962 | Burton et al. | 384/536 |
| 3,071,422 | 1/1963 | Hinks | 384/221 |
| 3,083,065 | 3/1983 | Hinks et al. | 384/221 |
| 3,103,348 | 9/1963 | Paulsen | 267/1 |
| 3,113,769 | 12/1963 | Pryale | 267/57.1 |
| 3,211,491 | 10/1965 | Browne et al. | 296/28 |
| 3,276,395 | 10/1966 | Heintzel | 384/459 |
| 3,330,519 | 7/1967 | Thorn | 248/358 |
| 3,504,902 | 4/1970 | Irwin | 267/1 |
| 3,504,905 | 4/1970 | Irwin | 267/1 |
| 3,511,492 | 5/1970 | Galbato | 267/1 |
| 3,528,712 | 9/1970 | Vacca et al. | 384/536 |
| 3,554,619 | 1/1971 | Irwin | 384/536 |
| 3,575,403 | 1/1969 | Hamel | 267/63 |
| 3,598,388 | 12/1969 | Hirst | 280/57.1 |
| 3,680,888 | 7/1970 | Hirst | 280/124 R |
| 3,730,509 | 4/1971 | Jorn | 267/152 |
| 3,787,102 | 1/1974 | Moran | 384/221 |
| 3,806,106 | 4/1974 | Hamel et al. | 267/152 |
| 3,857,556 | 12/1974 | Wing | 267/63 A |
| 3,873,077 | 3/1975 | Jorn | 267/152 |
| 3,921,776 | 11/1975 | Sonnerat | 192/98 |
| 3,941,433 | 3/1976 | Dolling et al. | 308/2 R |
| 3,960,418 | 1/1976 | Bracken | 384/535 |
| 3,975,007 | 8/1976 | Chorkey | 267/152 |
| 4,000,914 | 1/1977 | Wragg | 280/716 |
| 4,063,787 | 12/1977 | Bakken et al. | 384/221 |
| 4,084,861 | 4/1978 | Greenberg et al. | 384/99 |
| 4,105,266 | 8/1978 | Finney | 384/221 |
| 4,108,508 | 8/1978 | Clinard, Jr. | 384/221 |
| 4,142,833 | 3/1979 | Rybicki et al. | 416/134 A |
| 4,263,243 | 4/1981 | Wilson et al. | 264/137 |
| 4,286,827 | 9/1981 | Peterson et al. | 384/221 |
| 4,291,925 | 9/1981 | Peterson et al. | 384/221 |
| 4,337,982 | 7/1982 | Moringiello et al. | 384/99 |
| 4,349,184 | 9/1982 | Peterson et al. | 267/153 |
| 4,353,604 | 10/1982 | Dulberger et al. | 384/584 |
| 4,357,057 | 11/1982 | Peterson et al. | 384/125 |

*Primary Examiner*—John M. Jillions
*Assistant Examiner*—David Werner
*Attorney, Agent, or Firm*—J. Richard Konneker; Albert J. Miller

[57] ABSTRACT

A cantilevered bearing damper assembly has an elastomeric camping section which is maintained essentially entirely in a shear stress condition during lateral deflection of an annular bearing secured to the assembly.

21 Claims, 3 Drawing Figures

U.S. Patent  Jul. 22, 1986  4,601,591
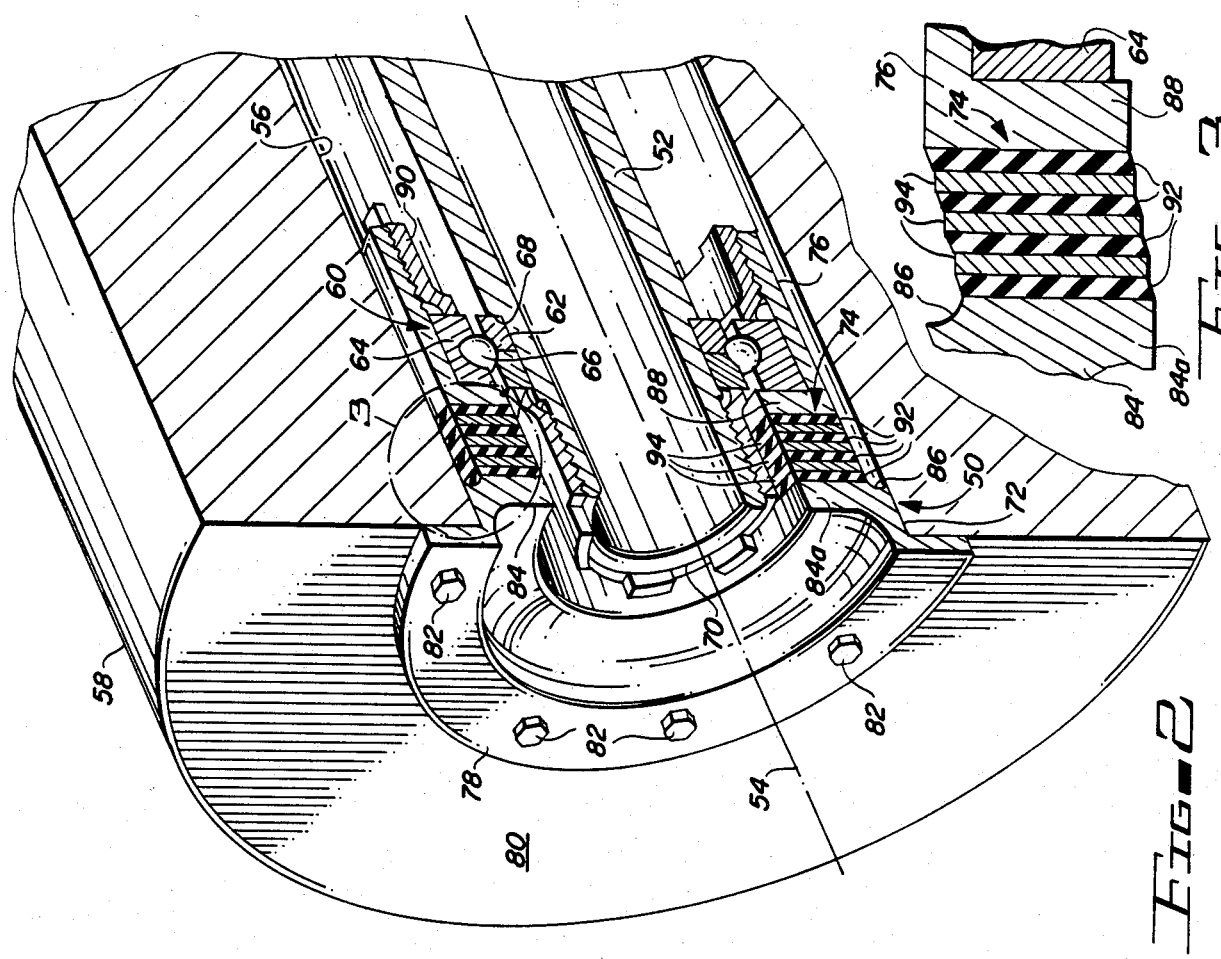
FIG-2
FIG-3
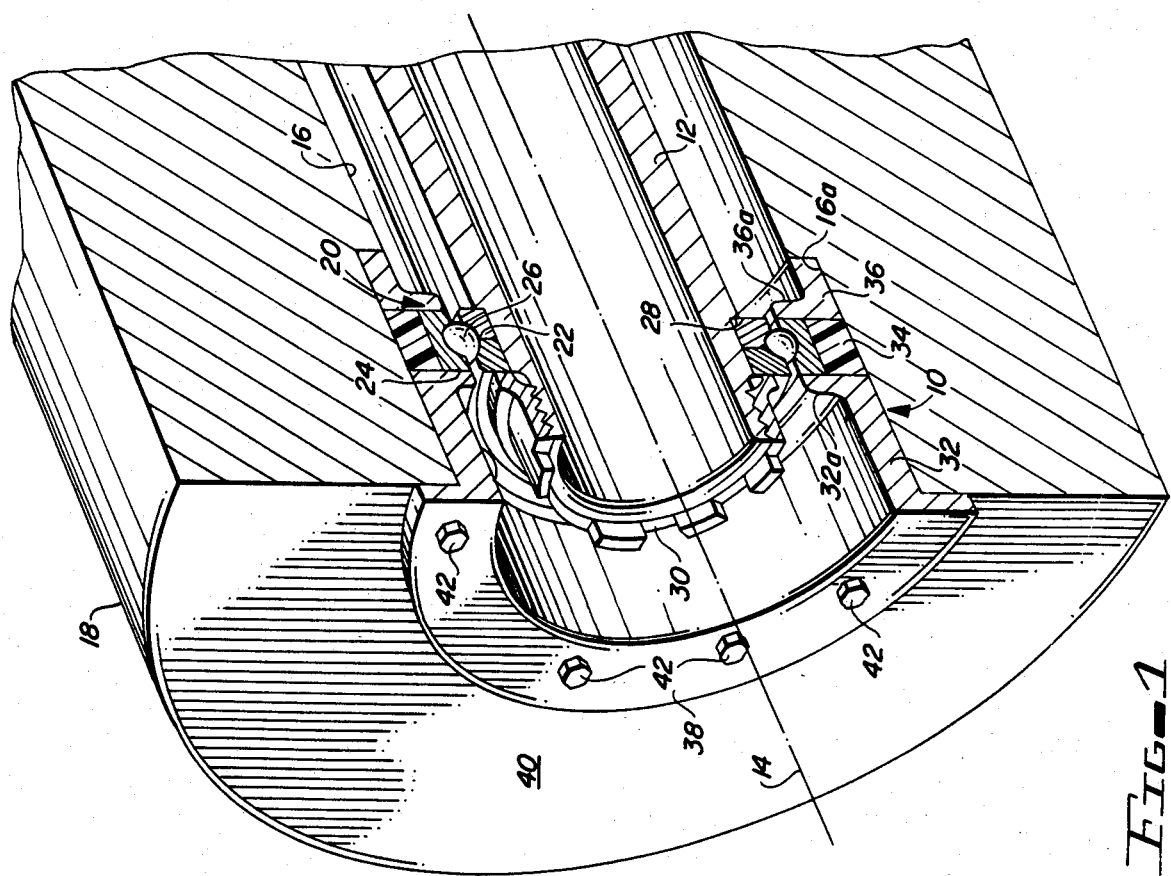
FIG-1
(PRIOR ART)

ELASTOMERIC BEARING DAMPER APPARATUS AND ASSOCIATED METHODS

BACKGROUND OF THE INVENTION

The present invention relates generally to the field of bearing dampers used to absorb and damp the deflections of bearing-supported shafts or other rotating apparatus. More particularly the invention provides a uniquely configured elastomeric bearing damper assembly which, for a bearing-supported shaft, provides highly linear lateral damping capabilities while additionally providing for resilient cushioning of axial shaft thrust loads.

The use of elastomeric material, such as rubber, neoprene or the like, to provide damping for various types of rotary bearings is well known in the bearing art. A conventional method of achieving such damping is to position an annular rotary bearing (such as a common ball or roller bearing) coaxially within an annular elastomeric member, and to restrain the bearing and damper so that lateral deflection of the bearing ("lateral", as used herein, meaning perpendicular to the bearing's axis) compresses a portion of its surrounding damper. In one common damper assembly the restraint of the bearing and damper member is effected by positioning annular flanges against the opposite side surfaces of the outer bearing race and the damping member, and placing the outer periphery of the damping member against appropriate supporting structure. The flanges permit radial movement of the outer bearing race, to thereby transmit to the damping member lateral deflections caused by imbalances in the rotating element supported by the bearing, but preclude appreciable axial deflection of the race.

Two inherent limitations and disadvantages are present in conventional bearing dampers of this type. First, it has been found that the radial compression of the elastomeric damping member provides only limited, and undesirably nonlinear, damping characteristics—especially in high rotational speed applications such as turbomachinery shaft support. Secondly, this conventional structure is incapable of absorbing axial thrust loads imposed upon the bearing without greatly increasing the bearing friction.

Accordingly, it is an object of the present invention to provide a bearing damper assembly which eliminates or minimizes the above-mentioned and other limitations and disadvantages associated with conventional bearing damper apparatus.

SUMMARY OF THE INVENTION

In accordance with principles of the present invention, a bearing damper assembly is provided which comprises a first support member adapted to be secured to a supporting structure, a second support member adapted to be secured to a bearing, and an elastomeric damping section positioned between and intersecuring the two support members. The damping section comprises elastomeric means for resiliently permitting relative deflections of the support members, and means for maintaining the elastomeric means essentially entirely in a shear stress condition in response to lateral deflection of a bearing operatively secured to the second support member. In a preferred embodiment of the invention the damper assembly is of a hollow generally cylindrical configuration with the damping section comprising an axially spaced and aligned series of elastomeric washer elements interdigitated with and secured to a similarly oriented series of metallic washer elements. During lateral bearing deflection the metal washers function to maintain each of the elastomeric washers in a shear stress condition by preventing appreciable bending of the damping section about axes perpendicular to the main assembly axis. The elastomeric washers also function to resiliently absorb axial bearing thrust loads.

BRIEF DESCRIPTION OF THE DRAWINGS

FIG. 1, designated as prior art, is a partially cut away perspective view of a conventional elastomeric bearing damper assembly shown operatively connected to a shaft-supporting rotary bearing;

FIG. 2 is a view similar to that of FIG. 1, but illustrating an improved elastomeric bearing damper assembly of the present invention; and FIG. 3 is an enlarged scale side elevational view of the portion of the elastomeric damping section of the FIG. 2 assembly within the dashed line area "3" during lateral deflection of the bearing.

DETAILED DESCRIPTION

Illustrated in FIG. 1 is a conventional elastomeric bearing damper assembly 10 which is used to absorb and damp the transverse vibrational movements of a hollow shaft 12 supported for rotation about its axis 14 within a bore 16 extending through support means such as a bearing housing 18 of a gas turbine engine. Shaft 12 is of a smaller diameter than bore 16 and is rotationally supported adjacent its left end by a conventional ball bearing 20 having an annular, axially split inner race 22, an annular outer race 24, and a circumferentially spaced series of balls 26 operatively positioned between the races. The inner bearing race 22 circumscribes the shaft 12 and is captively retained thereon between an annular shoulder 28 formed on shaft 12, and a lock nut 30 threaded onto the left end of the shaft.

Damper assembly 10 comprises an annular first support member 32, an annular elastomeric damper member 34, and an annular second support member 36. Each of the members 32, 34 and 36 circumscribes the shaft 12 and is received in an enlarged portion 16a of the bore 16 formed at the left end of housing 18, the damper member 34 being captively retained between the support members 32, 36 with the periphery of member 34 bearing against the surface of the bore portion 16a. At its left end the support member 32 has a radially outwardly directed annular mounting flange 38 which overlies the left end surface 40 of housing 18 and is secured thereto by bolts 42.

The outer bearing race 24 is positioned radially inwardly of and bears outwardly against the damper member 34, the outer race being captively and slidably retained between inwardly directed annular flanges 32a, 36a formed respectively on the support members 32, 36. Transverse vibrational motion of the rotating shaft 12 (caused, for example by minor shaft imbalances) is absorbed by the damper member 34 which is compressed by the outer race 24 as the bearing 20 is laterally deflected by the shaft. For example, if the shaft 12 deflects upwardly as viewed in FIG. 1, an upper arcuate portion of the damper member 34 is compressed by outer race 24, thereby resiliently resisting the upward shaft deflection.

The conventional bearing damper assembly 10 illustrated in FIG. 1, despite its simplicity and wide use, provides less than satisfactory damping performance in many applications and has several inherent problems and limitations. One serious drawback of this conventional damper arrangement is that its damping and compliance characteristics are constrained by the supporting structure (i.e. elements 18, 32 and 36) and are thereby highly non-linear.

Additionally, the rigid supporting structure of the assembly does not directly accommodate axial thrust load imposed upon the shaft 12. More specifically, since neither support member 32 nor support member 36 permits axial movement of the outer bearing race 24, axial thrust loads on the shaft are in no way resiliently absorbed by the supporting structure. Instead, such thrust loads undesirably cause increased bearing friction loads.

Such increased bearing friction manifests itself in two manners. First, because the outer race 24 is precluded from appreciable axial movement, significant axial loads on the inner race 22 can greatly increase the internal bearing friction. Secondly, and more importantly, axial thrust loads imposed upon the inner race increase the friction between the outer race and one of the flanges 32a, 36c (depending on the direction of the axial load). This increased external bearing friction impedes the lateral movement of the bearing relative to its supporting structure, thereby inhibiting or terminating the lateral damping capabilities of the assembly 10.

Another limitation of the conventional damper assembly is that for lateral deflection of shaft 12 in any given direction, only a portion of the damper member 34 is utilized (via its compression) to resist and absorb such deflection. The remainder of the damper member is inactive in this regard.

The present invention provides a substantially improved elastomeric bearing damper assembly 50, illustrated in FIG. 2, which essentially eliminates the limitations and disadvantages inherent in the conventional assembly 10 of FIG. 1. Like the conventional assembly 10, the assembly 50 is used to absorb and damp the transverse vibrational movements of a hollow shaft 52 about its axis 54 within a bore 56 extending through support means or structure such as a bearing housing 58 of a gas turbine engine. Shaft 52 is of a smaller diameter than bore 56 and is rotationally supported adjacent its left end by a conventional ball bearing 60 having an annular, axially split inner race 62, an annular outer race 64, and a circumferentially spaced series of balls 66 operatively positioned between the races. The inner race 62 circumscribes the shaft 52 and is captively retained thereon between an annular shoulder 68 formed on the shaft and a lock nut 70 exteriorly threaded onto the left end of the shaft.

Damper assembly 50 has a hollow cylindrical configuration and comprises, from left to right in FIG. 2, an annular first support member 72, an annular elastomeric damping section 74, and an annular second support member 76. Support member 72 has a radially outwardly directed mounting flange 78 which overlies a left end surface 80 of housing 58 and is secured thereto by a series of bolts 82. The balance of the support member 72 is closely received within a left end portion of bore 56 and has a radially inwardly directed end flange 84 positioned within the bore 56 immediately to the right of housing surface 80. An annular groove 86 is formed at the right end of flange 84 around its radially outer periphery, thereby positioning an annular right end portion 84a (FIG. 3) of such flange slightly inwardly of the surface of bore 56.

Annular support member 76 has a diameter slightly less than the diameter of bore 56 and is axially spaced from support member 72 within the bore. At its left end support member 76 has an radially inwardly directed annular flange 88 which faces the flange portion 84a and has a width generally equal thereto. The outer bearing race 64 is mounted on support member 76, being captively retained between flange 88 and a lock nut 90 interiorly threaded into a right end portion of support member 76.

The annular elastomeric damping section 74 is positioned between flange portion 84a and flange 88, and comprises a series of thin elastomeric washer elements 92 (of a suitable material such as neoprene) which are axially interdigitated in an aligned relationship with, and adhesively bonded to, a series of thin metal washer elements 94 having inner and outer diameters equal to those of the elastomeric washers. The cross-sectional width (measured in a radial direction) of the damping section 74 is identical to the widths of flange portion 84a and flange 88 as may best be seen in FIG. 2, the assembled damping section being positioned between and adhesively bonded at its opposite ends to the facing surfaces of flanges 84a and 88 in an aligned relationship therewith.

It can be seen that the flange portion 84a, the hollow cylindrical damping section 74, and the second support member 76 collectively define a portion of the damper assembly 10 which is axially cantilevered around its entire periphery, relative to the surface of bore 56. Because of this unique configuration and construction, lateral deflections of shaft 52 are resiliently resisted and damped by the elastomeric washers 92, each of which is subjected essentially entirely to shear stress around its entire periphery in response to such shaft deflection. This shaft deflection-imposed shear stress upon the washers 92 results in very effective and highly linear lateral damping for the shaft 52 and its bearing 60.

More specifically, with reference to FIG. 3, a representative upward deflection of shaft 52 causes (via the outer bearing race 64) an upward deflection of the cantilevered support member 76 relative to support member 84. This relative displacement, in turn, causes a lesser relative lateral displacement between the non-elastomeric elements (i.e., elements 84a, 88 and 94 as the case may be) secured to the opposite sides of each elastomeric washer 92. In this manner each of the washers 92 is laterally deformed as illustrated in FIG. 3, thereby placing the washers 92 in a shear stress condition around their entire peripheries to provide highly linear lateral damping for the shaft 52.

It is important to note that the elastomeric portion of the damper section 74 (i.e., the washers 92 collectively) is subjected essentially entirely to shear stress in response to lateral shaft deflections. Unlike the conventionally oriented elastomeric element 34 in FIG. 1, such lateral shaft deflection causes little if any compression (with its attendant damping inefficiencies) in the elastomeric damping section 74 of the present invention.

This unique result is effected by the use of the alternately disposed metal washers 94 which function to divide the total axial thickness of the elastomeric portion of damper section 74 into relatively thin, mutually spaced segments which are each highly resistive to bending about axes perpendicular to axis 54 in response to transverse shaft deflection. (Such bending would, as viewed in FIG. 2 tend to axially compress the upper portions of the washers 92 while axially stretching the lower portions, or vice versa, and pivot support member 76 relative to support member 72.)

Stated otherwise, the washers 94 function to stiffen the damper section 74 against bending to thereby force the individual elastomeric dampers 92 into a nearly total shear stress lateral damping mode to thereby assure that the axes of the relatively deflected support members 72, 76 are maintained in an essentially parallel relationship.

The unique construction of the damping section 74, and its novel orientation relative to the bearing 60, also greatly lessen the other primary problem commonly associated with the conventional damper of FIG. 1—that of axial rigidity of the damper structure which imposes high friction loads on the bearing 20 when the shaft 12 is subjected to axial thrust loads. In the damper assembly 50 of the present invention, such axial thrust loads on the shaft 52 are "cushioned" by the elastomeric washers 92 which are either axially compressed or stretched depending upon the direction of the shaft's thrust load. This axial cushioning effect of the washers 92 significantly decreases the heightened bearing friction occasioned by axial thrust loads imposed on the shaft 52.

More specifically, such axial cushioning by the elastomeric washers essentially eliminates both the internal and external bearing friction problems previously discussed with regard to the conventional damper assembly 10 of FIG. 1. The axial resiliency of the washers 92 permits axial deflection of the outer race 64 (thereby decreasing internal bearing friction) without significantly diminishing the lateral damping capabilities of the assembly 50 of the present invention. Whether the washers 92 are axially compressed or stretched, they still permit lateral deflections of the outer bearing race 64.

From the foregoing it can be seen that the present invention provides an elastomeric bearing damper assembly which, compared to conventional assemblies such as that depicted in FIG. 1, affords substantially improved lateral damping characteristics and a significantly greater axial thrust absorbing capabilities.

The foregoing detailed description is to be clearly understood as given by way of illustration and example only, the spirit and scope of this invention being limited solely by the appended claims.

What is claimed is:

1. Apparatus for absorbing and damping deflections of a bearing, comprising:
   (a) a first support member adapted to be secured to a support structure;
   (b) a second support member spaced apart from said first suoport member in a first direction;
   (c) means for securing said second support member to a portion of a bearing for movement therewith; and
   (d) a damping section positioned between and intersecuring said first and second support members, said damping section including:
      (1) elastomeric means for permitting resilient deflection of said second support member relative to said first support member in a second direction generally perpendicular to said first direction in response to lateral deflection of the secured bearing, and
      (2) means for maintaining said elastomeric means essentially entirely in a shear stress condition during deflection of said second support member in said second direction relative to said first support member.

2. The apparatus of claim 1 wherein said elastomeric means and said means for maintaining respectively comprise a series of elastomeric elements mutually spaced in said first direction, and a mutually spaced series of nonelastomeric elements interdigitated with and intersecured to said series of elastomeric elements.

3. The apparatus of claim 2 wherein said first support member, said second support member and said means for securing have hollow cylindrical configurations and are in axial alignment with one another.

4. The apparatus of claim 3 wherein each of said elastomeric and nonelastomeric elements is generally flat washer-shaped and bonded to each washer-shaped element contiguous therewith.

5. The apparatus of claim 4 wherein said means for securing include means for securing said second support member to a radially outer circumferential portion of an annular bearing.

6. The apparatus of claim 5 wherein said means for securing include means for positioning a radially outer circumferential portion of an annular bearing within said second support member in axial alignment therewith.

7. An elastomeric bearing damper assembly comprising:
   (a) an annular first support member adapted to be secured to a supporting structure;
   (b) an annular second support member axially aligned with and spaced apart from said first support member;
   (c) means for securing an annular bearing to said second support member in an axially aligned relationship therewith; and
   (d) annular elastomeric damping means, coaxially positioned between and intersecuring said first and second support members, for resiliently resisting relative lateral displacement of said first and second support members in a manner maintaining the axes of said first and second support members in an essentially parallel relationship during relative lateral displacement thereof and stressing said damping means essentially entirely in shear during said relative lateral displacement of said first and second support members.

8. The damper assembly of claim 7 wherein said damping means include an axially spaced and aligned series of annular elastomeric elements interdigitated with and intersecured to an axially spaced and aligned series of annular nonelastomeric elements.

9. The damper assembly of claim 8 wherein each adjacent pair of annular elements in said damping means are adhesively bonded together.

10. The damper assembly of claim 9 wherein each of said annular elements in said damping means has a flat washer-shaped configuration.

11. The damper assembly of claim 10 wherein said second support member has an annular internal flange, and said means for securing include means for holding a radially outer portion of an annular bearing against said flange.

12. The damper assembly of claim 11 wherein an outer end portion of said second support member is internally threaded, and said last-mentioned means include a lock nut threadingly engageable with said internally threaded portion.

13. Apparatus for resiliently absorbing axial and lateral deflections of an annular bearing, comprising:
  (a) an annular first support member adapted to be secured to a supporting structure;
  (b) an annular second support member axially spaced from and aligned with said first support member;
  (c) a circular cylindrical damping section extending coaxially between said first and second support members and secured at its opposite ends thereto, said damping section including:
    (1) a mutually spaced series of axially aligned, annular elastomeric elements, and
    (2) a mutually spaced series of axially aligned, annular nonelastomeric elements interdigitated with and secured to said series of elastomeric elements; and
  (d) means for securing a radially outer portion of an annular bearing to said second support member.

14. The apparatus of claim 13 wherein said second support member and said damping section each have an outer diameter less than the outer diameter of said first support member.

15. The apparatus of claim 14 wherein each element in said series of elastomeric and nonelastomeric elements has a generally flat washer-shaped configuration.

16. The apparatus of claim 15 wherein each adjacent pair of annular elements in said damping section are adhesively bonded together.

17. The apparatus of claim 13 wherein said means include means for positioning a radially outer portion of an annular bearing within said second support member in axial alignment therewith.

18. A method of damping lateral deflections of a shaft rotatably supported by a bearing, said method comprising the steps of:
  (a) providing a bearing damper assembly having first and second support members spaced apart and intersecured by a damping section having an elastomeric portion adapted to permit resilient relative deflection of said first and second support members;
  (b) securing said first support member to a support structure in a manner cantilevering said second support member and said damping section in a first direction relative to the support structure;
  (c) securing the bearing to said second support member in a manner causing deflection of said second support member relative to said first support member in a second direction generally perpendicular to said first direction in response to lateral deflection of the shaft; and
  (d) maintaining said elastomeric portion of said damping section essentially entirely in a shear stress condition during deflection of said second support member in said second direction relative to said first support member.

19. The method of claim 18 wherein said providing step (a) includes forming said elastomeric portion from a mutually spaced series of elastomeric elements, and said maintaining step (d) includes interdigitating with and intersecuring to said elastomeric elements a mutually spaced series of nonelastomeric elements.

20. The method of claim 18 wherein said providing step is performed by providing a bearing damper assembly of hollow cylindrical configuration in which said support members are axially aligned with said damper section, and said elastomeric portion is defined by an axially spaced and aligned series of elastomeric washer elements, and said maintaining step includes interdigitating with and intersecuring to said series of elastomeric washer elements an axially spaced and aligned series of nonelastomeric washer elements.

21. The method of claim 20 wherein the bearing has an annular configuration and said bearing securing step is performed by securing a radially outer portion of the bearing within said second support member in an axially aligned relationship therewith.

* * * * *